United States Patent [19]

Clausen et al.

[11] 3,901,748

[45] Aug. 26, 1975

[54] METHOD OF TREATING PHOTOFLASH LAMP CONSTRUCTION

[75] Inventors: Edward M. Clausen, Eastlake, Ohio; Robert G. Clemmer, Madison, Wis.

[73] Assignee: General Electric Company, Schenectady, N.Y.

[22] Filed: Dec. 19, 1973

[21] Appl. No.: 426,165

Related U.S. Application Data

[62] Division of Ser. No. 308,425, Nov. 21, 1972, Pat. No. 3,813,205.

[52] U.S. Cl. ............................ 156/25; 252/79.3
[51] Int. Cl.² .................. C03C 15/00; C03C 25/06
[58] Field of Search ......................... 431/93–95; 65/31; 117/54; 156/24, 25; 252/79.3

[56] References Cited
UNITED STATES PATENTS

| | | | |
|---|---|---|---|
| 3,061,495 | 10/1962 | Alford | 156/25 |
| 3,291,640 | 12/1966 | Livingston | 134/1 |
| 3,294,603 | 12/1966 | Myers | 156/24 |

*Primary Examiner*—William A. Powell
*Attorney, Agent, or Firm*—John F. McDevitt; Lawrence R. Kempton; Frank L. Neuhauser

[57] ABSTRACT

A miniature photoflash lamp is provided having a hermetically sealed glass envelope which has been given a liquid etching treatment on the exterior surface to reduce thermal failure of the lamp by fracture of the glass envelope when the lamp is flashed. The present lamps can be further characterized as having a light output of at least about 12,500 lumen-seconds per cubic centimeter of internal lamp volume with better containment of the photoflash reaction than can be obtained with prior art construction of such lamps. A novel method of the liquid etching treatment is also described which utilizes ultrasonic energy to improve the treatment process.

9 Claims, No Drawings

METHOD OF TREATING PHOTOFLASH LAMP CONSTRUCTION

BACKGROUND OF THE INVENTION

This is a division of application Ser. No. 308,425, filed Nov. 21, 1972, now Pat. No. 3,813,205.

The present invention relates to miniature photoflash lamps generally of the all-glass type. More particularly, the present lamps represent improvements of the type lamp described and claimed in U.S. Pat. No. 3,506,385 to Curt H. Weber and George W. Cressman which is assigned to the assignee of the present application. The lamp type disclosed in said patent is of a high performance type which contains a higher loading of combustible material and oxidizer than is found in prior art lamps and the lamp construction generally comprises a hermetically sealed glass envelope, ignition means within said envelope, an oxidizing atmosphere at a pressure of at least several atmospheres, and a filamentary combustible metallic material having an oxide with a melting point above about 2200°C. Said lamp construction can be further characterized as having a glass envelope consisting essentially of the following constituents in about the ranges stated by weight: 60 to 75% $SiO_2$, 10 to 25% $B_2O_3$, 1 to 10% $Al_2O_3$, 4 to 10% total alkali oxides and 0 to 5% BaO except for incidental impurities and residual fluxes and refining agents, and also having a mean coefficient of linear thermal expansion between 0 and 300°C about in the range of 40 to $50 \times 10^{-7}$ per °C. A preferred embodiment of said lamp further utilizes at least one electrical in-lead through said envelope with said in-lead being composed of an alloy consisting essentially of iron, nickel and cobalt, and optionally containing minor amounts of manganese wherein there is a direct hermetic seal provided between the glass and said electrical in-lead. Suitable alloys for such in-lead construction include those known by the names Kovar, Rodar, Therlo, Fernico I, Fernico II, Nicoseal, Nilok, Sealvac A, and others. Commercially, these are alloys predominantly of iron, nickel and cobalt and optionally contain manganese in amounts generally less than 1%, preferably less than 0.5%, along with incidental impurities. The general range of compositions for such alloys is 27 to 32% nickel, 14 to 19% cobalt, less than 1.0% manganese, and the balance ion, except for incidental impurities.

Especially preferred glass compositions for the glass envelope of the aforementioned lamps are approximately: 21% $B_2O_3$, 8.4% $Al_2O_3$, 3% BaO, 2.3% $Na_2O$, 2.4% $K_2O$, 0.5% $Li_2O$ and the balance $SiO_2$, having a thermal coefficient expansion in the above mentioned range of about 47, known commercially as 7052 glass; another of 15% $B_2O_3$, 3.5% $Al_2O_3$, 7 to 7.5% $Na_2O$, 1.2% $K_2O$, 1% BaO, 0.3% $Sb_2O_3$, and the balance $SiO_2$, having said thermal expansion coefficient of about 51, herein referred to as 706 glass. Essentially equivalent narrow composition ranges for these glasses are: glass 7052—60 to 65% $SiO_2$, 19 to 23% $B_2O_3$, 8 to 9% $Al_2O_3$, 4.5 to 5.5% total alkali oxides and 2 to 4% BaO; glass 706—68 to 73% $SiO_2$, 13 to 17% $B_2O_3$, 2 to 4.5% $Al_2O_3$, 7 to 9% total alkali oxides, and 0 to 2% BaO. The glass envelopes of said lamps are also provided with a transparent protective organic polymer coating to help contain the photoflash reaction when the lamps are flashed.

A beneficial fracture mechanism of the glass envelope when such lamps are flashed is also described in the aforementioned patent. Summarizing said fracture mechanism insofar as pertains to the present invention, there is a substantial mode of fracture of the glass envelope on flashing of the photoflash lamp wherein only layers of parts of the internal surface of the glass envelopes spall off at the loci of impingement of hot combustion residues which results in delaying the penetration of cracks through the thickness of the glass envelope. This delay in penetration of cracks through the thickness of the glass envelope is sufficient relative to instantaneous gas pressure in said lamp so that the time to penetrating fracture is shifted to substantially later times than for prior art commercial lamps. Such behavior of the glass envelope permits greater loading of the lamp with combustible material and oxidizer for greater light output per unit volume of the lamp with at least as good containment of the lamp upon flashing as could be obtained with prior art lamps.

The products and methods of the present invention constitute improvements over said earlier disclosure which can utilize the same general lamp construction and method of manufacture to construct the improved lamp products of the present invention. Consequently, a more detailed description of the basic lamp and its method of manufacture need not be repeated in the present specification except to explain the methods and products of the present invention.

SUMMARY OF THE PRESENT INVENTION

It is now been found, surprisingly, that the photoflash reaction can be further contained significantly by a liquid etching treatment of the lamp to remove surface defects such as scratches, cracks, checks, and other discontinuities which are otherwise present on the exterior of the glass envelope. The etching process is further enhanced through a utilization of ultrasonic energy which is applied to the liquid etching agent while in contact with the exterior surface of the glass lamp envelope.

The object of the present invention, therefore, is to provide a superior photoflash lamp construction including improved methods to construct the lamp. Still a further object of the present invention is to provide miniature high performance photoflash lamps which are less subject to thermal failure of the glass envelope when the lamp is flashed than has been achieved with the prior art lamps. A still further object of the present invention is to provide a simple and reliable method of manufacturing miniature high performance photoflash lamps using readily available equipment means.

Briefly stated, the present invention is carried out by contacting the glass envelope of a miniaturized photoflash lamp with a liquid etching agent, thereafter applying ultrasonic energy to the liquid etching agent while in contact with the glass lamp envelope, and terminating contact between said liquid etching agent and the glass lamp envelope before a visible etch has been produced on the exterior surface of the glass. While the degree of etch obtained in this manner does not provide a contrasting appearance of the glass surface from its normal appearance, it is sufficient to materially improve the mechanical strength of the glass envelope as will be apparent from physical tests hereinafter reported in the present specification.

DESCRIPTION OF THE PREFERRED EMBODIMENTS

The present invention provides simple and effective means to reduce a major problem encountered when a miniaturized photoflash lamp is flashed. During the combustion process of said photoflash reaction, minute particles of combustion residues including metal oxide molten metals such as zirconium oxide and zirconium metal are impinged against the inner surfaces of the lamp wall. The resulting thermal and mechanical shock normally leads to general laterally permeating fracture penetrating through the glass walls of the lamp glass envelope. While the frequency of such thermal failure has been significantly reduced in the particular photoflash lamp construction which is described and claimed in the aforementioned patent, a still further decrease in this serious failure would understandably be desirable. The present applicants have discovered that a significant factor causing thermal failure is the presence of surface defects such as scratches, cracks, checks, and other discontinuities which are normally present on the exterior surface of the glass envelope after conventional manufacture. To remove these defects, it has been found that a particular liquid etching treatment after the lamp has been constructed is sufficient to substantially eliminate the thermal failure problem. When the photoflash lamps given such treatment were flashed before application of the protective organic coating, a reduction in thermal failures from 24% to 2% was obtained on the lamps tested.

The present liquid treatment is carried out after the lamp has been constructed in conventional fashion, but prior to application of any transparent protective organic polymer coating upon the lamp glass envelope. In one preferred embodiment, approximately 200 lamps were immersed in a polyethylene beaker containing approximately 500ml of a 10 molar hydrofluoric acid aqueous solution. Various concentrations of this liquid etching agent can be employed successfully in a range from approximately 10 to 20 molar concentration of hydrofluoric acid. A specific liquid etching treatment was carried out in a 1000ml polypropylene beaker which had been placed in the tank having a size of 5 inches × 5½ × 6 inches and which tank further contained water in order to transmit the ultrasonic energy being employed during the present treating process. The particular metal tank was also operatively associated for ultrasonic agitation of the contents with a Branson Model D-50 ultrasonic cleaner unit having an output frequency of 40 kilocycles and an output power of 50 watts. The time periods of the etching treatment being conducted in this manner with ultrasonic agitation can also vary from approximately 2 to 10 minutes in obtaining the desired result with longer time periods generally being employed for the less concentrated solutions of liquid etching agent. Understandably, any change in the output power, frequency, or energy transfer of the ultrasonic energy being applied would affect the time period and concentration of liquid etching agent needed to obtain the same result. After etching, the lamps were immediately rinsed in tap water followed by two (2) rinses in deionized water and then dried in an oven at 90°C. The lamps can thereafter be given the conventional coating with a transparent protective organic polymer film which further serves to minimize any reoccurrence of surface defects upon the lamp glass envelopes from additional handling.

While the degree of etching provided in the foregoing manner has not been investigated fully at this time, certain characteristics of the etch and its effects are known. More particularly, the treated lamp glass envelope does not have a frosted appearance as takes place when incandescent lamps are etched and a treated glass surface has the same appearance as an unetched surface. What is believed to have taken place in the present process is simply a rounding out of the flaws or surface defects in the outer surface of the lamp glass envelope, but which is not accompanied by any significant reduction in thickness of the glass wall. Chemical analysis of the hydrofluoric acid solution utilized in the above embodiment before and after the lamps were etched also found very little acid consumption. For example, only 7% of the available acid was used after a six minute treatment period in a 10 molar HF solution. Corresponding measurements of weight loss which can be attributed primarily to dissolved glass from the exterior surface of the lamp glass envelopes found only a 5% weight loss from etching at the aforesaid conditions. While stronger concentrations of the liquid etching agent have been found to etch at an accelerated rate, it is also believed that the flaws of surface defects in the exterior surface of the glass envelope are preferentially etched so that it may be more desirable to use lower level concentrations of the etching.

A second characteristic feature of the present liquid etching treatment is significant improvement obtained in the mechanical strength of the lamp glass envelope. While actual physical testing of mechanical strength before and after carrying out the present liquid treatment could not be readily achieved by reason of the small size and shape of the particular lamp construction being dealt with, it was possible to make measurements upon the borosilicate glass tubing used in this lamp manufacture. More particularly, modulus of rupture measurements tests were conducted before and within 3 hours after treatment in accordance with the above embodiment to determine the effect upon mechanical strength of the glass. The modulus of rupture of the tubes was determined by a conventional three-point loading procedure with vertical loading being applied downwardly at the center of the sample causing the glass to bend. This bending causes tension and compression forces in the glass tube with the highest tensile stress occurring at the bottom surface of the tube directly opposite the loading point. This same type tensile stress causes thermal failure of the lamp when flashed. The measurements were conducted upon the borosilicate glass tubes having dimensions of 2⅜ -inch in length, a ¼-inch outside diameter and a 3/16-inch inside diameter. The tubes were tested over a 2 inch span while being supported upon two knife edges at the ends and with the load being applied at the center by a third knife edge. An Instron Model TM testing machine was employed for the test at a vertical strain rate of 0.02 inch per minute which corresponds to a stress rate of 32 kg/min so that the tubes underwent elastic deformation until rupture. Results of these tests upon tubes having a 706 glass composition in accordance with the above embodiment showed an increase in the mean strength after the liquid etching treatment by a factor of about 2.5.

A reduction in thermal failure of the same miniaturized photoflash lamp has been obtained with a modification of the liquid treatment embodiment above described. More particularly, a quantity of 100 lamps were suspended by the in-lead elements from a nylon screen basket in such a manner as to prevent contact between the individual lamp glass envelopes during ultrasonic agitation of the liquid etching treatment. A Sonogen ultrasonic cleaning unit Model LGTH-40 was used which operated at 40 watts and 25 kilohertz. A polyethylene beaker containing the hydrofluoric acid etching solution was placed in a vat of trichloroethylene held in the metal tank of the ultrasonic cleaning unit to provide the means for ultrasonic agitation. The nylon screen basket containing the suspended lamps was then placed in the polyethylene beaker and the same liquid etching treatment carried out as was described in the preceding embodiment. Again, it was observed that higher acid concentrations provided greater mechanical strength to the lamp glass envelopes which can be attributed to an increase in the etching rate upon the surface defects. Further tests confirmed that such etching treatment is effective in virtually eliminating all thermal failures when the lamps are flashed. As a further observation of the effects produced by the liquid etching treatment in accordance with the present invention, it was also noted that the exposed in-lead wire surfaces of the treated lamps were only lighted etched which did not deleteriously affect the lamp performance.

Other liquid etching agents can also be used in carrying out the present treatment with comparable results. As an example, ammonium bifluoride solutions in water can be substituted for the hydrofluoric acid solutions at equivalent concentration levels. It can also be expected that still other etching solutions used in connection with softer glasses than the present borosilicate glasses would prove effective in reducing thermal failure in a miniaturized photoflash lamp.

It will be apparent from the foregoing description of preferred embodiments that further modifications of the present liquid treatment be carried out. For example, the etching treatment could be carried out at more elevated temperatures than room temperature and thereby increase the etching rate although the time periods above specified for etching are sufficiently short for commercial acceptance. Likewise, some variation in the ultrasonic energy parameters above specified might be employed with adjustment of the remaining etching conditions. It is intended to limit the present invention, therefore, only by the scope of the following claims.

Claims:

1. A method of reducing thermal failure in a miniaturized photoflash lamp having a lamp envelope composed of a glass consisting essentially of the following constituents in about the ranges stated by weight of 60 to 75% $SiO_2$, 10 to 25% $B_2O_3$, 1 to 10% $Al_2O_3$, 4 to 10% total alkali oxides, and 0 to 5% BaO except for incidental impurities and residual fluxes and refining agents which comprises:
   a. contacting the glass envelope of the lamp before flashing with a liquid etching agent,
   b. applying ultrasonic energy to the liquid etching agent while in contact with the glass lamp envelope, and
   c. terminating contact between said liquid etching agent and the glass lamp envelope before a visible etch has been produced.

2. A method as in claim 1 wherein the etching agent is hydrofluoric acid.

3. A method as in claim 1 wherein the etching agent is ammonium bifluoride.

4. A method of reducing thermal failure in a miniaturized photoflash lamp having a lamp envelope composed of a glass consisting essentially of the following constituents in about the ranges stated by weight of 60 to 75% $SiO_2$, 10 to 25% $B_2O_3$, 1 to 10% $Al_2O_3$, 4 to 10% total alkali oxides, and 0 to 5% BaO except for incidental impurities and residual fluxes and refining agents which comprises:
   a. immersing the lamp in a liquid solution containing sufficient etching agent to etch the glass envelope of the lamp,
   b. applying ultrasonic energy to said liquid solution while the lamp is immersed, and
   c. removing the lamp from said liquid solution before a visible etch has been produced.

5. A method as in claim 4 wherein the etching agent is hydrofluoric acid.

6. A method as in claim 4 wherein the etching agent is ammonium bifluoride.

7. A method as in claim 5 employing approximately 10 to 20 molar hydrofluoric acid concentration.

8. A method as in claim 7 wherein the immersion time period is from approximately 2 to 10 minutes.

9. A method as in claim 8 wherein the ultrasonic energy being applied is at a frequency of about 20 kilohertz at intensities of approximately 40 watts output.

* * * * *